H. HAAS.
TOOL FOR TAKING SAMPLES.
APPLICATION FILED JUNE 6, 1914.
1,205,888.
Patented Nov. 21, 1916.
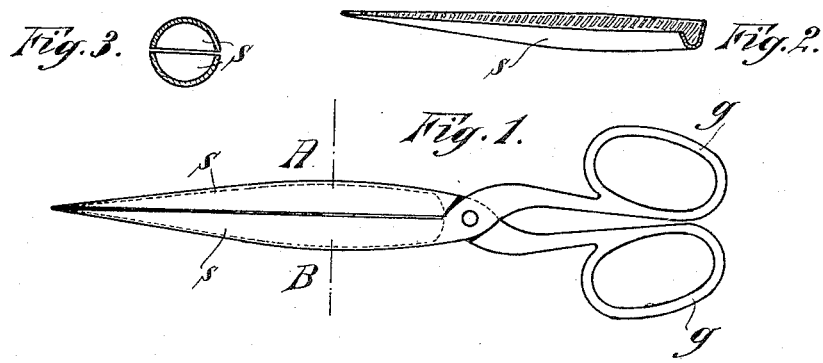
Witnesses:
William S. Hard
Herbert Langner.
Inventor:
Hermann Haas,
by Lawrence Langner
Attorney.

UNITED STATES PATENT OFFICE.

HERMANN HAAS, OF DUSSELDORF, GERMANY.

TOOL FOR TAKING SAMPLES.

1,205,888.  Specification of Letters Patent.  Patented Nov. 21, 1916.

Application filed June 6, 1914. Serial No. 843,462.

*To all whom it may concern:*

Be it known that I, HERMANN HAAS, a subject of the King of Prussia, and resident of 12 Schirmerstrasse, Dusseldorf, Germany, have invented a certain new and useful Tool for Taking Samples, of which the following is a specification.

This invention relates to a tool for taking samples of pulverulent, ground or granular materials, or of materials similar to lard, tallow or wax. The materials for example will include flour, barley, corn, rice, coffee, seeds, shell fruit, paints, chalk, gypsum, cement, animal and vegetable fat, drugs of small flake form, tea and so forth from bales, sacks and the like.

It is the object of the invention so to construct the tool that the samples may be taken from the bales or sacks without opening these or removing them from their position and without materially damaging them. By means of the tool it is possible to ascertain easily and conveniently the quality of a bulk or load of such goods which are usually stacked in large quantities.

The tool for taking samples consists according to the invention of a long, strong hollow member which for example may consist of two long, hollow, and similar shells of which the open sides are placed together and form a beak-like hollow pointed member, adapted to be opened and closed by hand pieces.

In the accompanying drawings is illustrated a preferred form of device embodying my invention.

Figure 1 shows one example of construction of the apparatus in the closed position. Fig. 2 shows one of the hollow parts of the apparatus according to Fig. 1. Fig. 3 shows a section on the line A—B of Fig. 1.

The tool according to Figs. 1 to 3 is in the form of an ordinary pair of scissors but differs therefrom in that two long hollow and preferably similar shells *s*, *s* are used instead of the usual wedge-shaped cutters, these shells having their hollow faces placed together so as to form a hollow beak-like pointed member. The hollow shells are prolonged to form the hand-pieces *g*, *g*, and at the point of crossing one another these are riveted or screwed together so that the tool can be opened and closed by the hand-pieces. The tool, when in the closed position, is adapted to be inserted at any suitable accessible point of the sack or bale by means of its point, thus spreading apart the texture of the sack or the like without tearing it; the tool may then be opened, by suitably manipulating the hand-pieces, so as to be filled with some of the material of which a sample is to be taken. The tool is then closed by pressing together the hand-pieces and withdrawn from the sack or the like so that the sample may be removed from the tool after this has again been opened.

It will be understood that the tool need not necessarily be symmetrical as shown in the drawings, but that in the case of the scissor form it would be sufficient if one part were composed of a hollow shell while the other part formed a lid for this shell, of any convenient shape.

Having thus described my invention, what I claim as new and desire to secure by Letters Patent is:—

A tool for taking samples comprising two members pivoted together at a point intermediate their ends, said members being formed as handles on one side of the pivot, and being formed at the other side of the pivot of narrow tapered half-shell sections, the line of width of each of which is parallel with the pivotal line of the members, each half-shell section extending from adjacent the pivot and terminating in a point, the half-shell sections when brought together having their edges flush with one another and forming a completely closed pointed, tapered cone.

In witness whereof, I have hereunto signed my name this 19th day of May, 1914, in the presence of two subscribing witnesses.

HERMANN HAAS. [L. S.]

Witnesses:
 HELEN NUFER,
 FRANCES NUFER.